United States Patent
Clark

(10) Patent No.: US 7,695,594 B2
(45) Date of Patent: Apr. 13, 2010

(54) METHOD FOR SEPARATING VOLATILE COMPONENTS BY DILUTIVE DISTILLATION

(76) Inventor: Arthur F. Clark, 25835 Buffalo La., Golden, CO (US) 80401

( * ) Notice: Subject to any disclaimer, the term of this patent is extended or adjusted under 35 U.S.C. 154(b) by 0 days.

(21) Appl. No.: 10/538,322

(22) PCT Filed: Sep. 30, 2004

(86) PCT No.: PCT/US2004/031913

§ 371 (c)(1),
(2), (4) Date: Jun. 10, 2005

(87) PCT Pub. No.: WO2005/032687

PCT Pub. Date: Apr. 14, 2005

(65) Prior Publication Data

US 2006/0054486 A1    Mar. 16, 2006

Related U.S. Application Data

(60) Provisional application No. 60/506,755, filed on Sep. 30, 2003.

(51) Int. Cl.
| | |
|---|---|
| *B01D 3/06* | (2006.01) |
| *B01D 3/38* | (2006.01) |
| *B01D 3/42* | (2006.01) |
| *C07C 29/80* | (2006.01) |
| *C07C 31/18* | (2006.01) |
| *C07C 209/86* | (2006.01) |

(52) U.S. Cl. .................. 203/2; 203/88; 203/96; 203/97; 203/98; 203/DIG. 25; 564/206; 564/497; 568/852; 568/868

(58) Field of Classification Search ............ 203/2, 203/88, 95–98, DIG. 25; 564/206, 497; 568/852, 568/868
See application file for complete search history.

(56) References Cited

U.S. PATENT DOCUMENTS

| | | | |
|---|---|---|---|
| 3,120,525 A | | 2/1964 | Muhlbauer et al. |
| 3,398,061 A | | 8/1968 | Kassel-Bettenhausen |
| 3,632,482 A | * | 1/1972 | Hoory et al. .................. 203/56 |
| 3,809,724 A | | 5/1974 | Golden |
| 3,929,586 A | | 12/1975 | Slikkers, Jr. |
| 4,009,083 A | * | 2/1977 | Lyon et al. ..................... 203/49 |
| 4,028,195 A | | 6/1977 | Becker et al. |
| 4,057,471 A | | 11/1977 | Chueh |
| 4,134,797 A | | 1/1979 | Ozero |
| 4,151,048 A | | 4/1979 | Becker et al. |
| 4,187,153 A | | 2/1980 | Peltzman et al. |
| 4,225,394 A | * | 9/1980 | Cox et al. ...................... 203/37 |
| 4,276,126 A | | 6/1981 | Saffer |

(Continued)

FOREIGN PATENT DOCUMENTS

GB    2142549 A    1/1985

*Primary Examiner*—Virginia Manoharan
(74) *Attorney, Agent, or Firm*—Clark & Brody

(57) ABSTRACT

A distillation process for separating a target component from a mixture containing a solvent and the target includes the steps of flashing off a vapor mixture of said solvent and said target in an evaporator, separating said target from said vapor mixture, and providing additional solvent to said evaporator to maintain the temperature of said evaporator substantially below the boiling point of said target. The process also includes the step of removing accumulated non-volatile components from said evaporator by allowing the non-volatile components to precipitate from a mixture of the target and the solvent.

8 Claims, 2 Drawing Sheets

U.S. PATENT DOCUMENTS

| | | |
|---|---|---|
| 4,323,432 A | 4/1982 | Ohtani et al. |
| 4,608,119 A * | 8/1986 | Rowland .................. 159/3 |
| 4,678,544 A | 7/1987 | Wideman |
| 4,720,327 A | 1/1988 | Aquila et al. |
| 4,740,273 A | 4/1988 | Martin et al. |
| 4,830,712 A | 5/1989 | Crandall et al. |
| 4,857,151 A | 8/1989 | Suciu et al. |
| 4,983,260 A | 1/1991 | Neel et al. |
| 5,064,507 A * | 11/1991 | O'Donnell et al. ............ 203/34 |
| 5,162,081 A | 11/1992 | Bowes |
| 5,236,558 A | 8/1993 | Buyalos et al. |
| 5,262,013 A * | 11/1993 | Beal et al. .................. 203/18 |
| 5,294,305 A | 3/1994 | Craft, Sr. et al. |
| 5,441,605 A * | 8/1995 | Beasley et al. ............. 202/176 |
| 5,693,190 A | 12/1997 | Schneider |
| 5,830,324 A * | 11/1998 | Downs et al. ................. 203/1 |
| 5,849,161 A | 12/1998 | Kishimoto et al. |
| 6,264,800 B1 | 7/2001 | Gupta |
| 6,299,737 B1 | 10/2001 | Mohr et al. |
| 6,306,263 B1 | 10/2001 | Gupta |
| 6,478,930 B2 | 11/2002 | Gupta |
| 6,525,229 B2 | 2/2003 | Baars et al. |
| 6,538,164 B1 | 3/2003 | Gallagher et al. |
| 6,565,753 B1 | 5/2003 | Holmgren et al. |
| 2007/0265465 A1 * | 11/2007 | Keggenhoff et al. ........ 560/347 |

* cited by examiner

METHOD FOR SEPARATING VOLATILE COMPONENTS BY DILUTIVE DISTILLATION

This application is the national stage of International Application Number PCT/US2004/031913, filed Sep. 30, 2004, which was published in English, and claims priority of U.S. Provisional Application Number 60/506,755, filed Sep. 30, 2003.

TECHNICAL FIELD

This invention relates to the art of recovering components of solutions by distillation. In a preferred embodiment, the invention relates to the recovery of components normally degraded by distillation at high temperatures, such as ethylene glycol, and to the recovery of such components from solutions having low-volatility contaminants.

BACKGROUND ART

Separating volatile components from a solution by distillation is known, and several types of distillation are well known. Distillation takes advantage of differences in the property of volatility, or boiling point, which refers to the tendency of a substance to evaporate. Substances of higher volatility evaporate more easily, and a highly volatile substance has a low boiling point. Conversely, a substance of low volatility has a high boiling point. Another quantitative measure of the volatility of a substance is its vapor pressure.

Standard distillation is typically performed in a distillation column, which includes a series of vertically spaced plates. A feed stream enters the column at a mid-point, dividing the column into two sections; the top section being called the rectification section, and the bottom section being called the stripping section. Condensation and vaporization occur on each plate, causing lower boiling point components to rise to the top of the column and higher boiling point components to fall to the bottom. A re-boiler is located at the base of the column to add thermal energy. The "bottoms" product is removed from the base of the column. A condenser is located at the top of the column to condense the product emanating from the top of the column, which is called the distillate. A reflux pump is used to maintain flow in the rectification section of the column by pumping a portion of the distillate back into the column.

In any solution, the vapor above the solution will be a combination of all of the volatile components in the solution, but it will have more of the component that evaporates more easily (i.e., the more volatile substance). In other words, the vapor above a 50/50 mixture of two different liquids will have more than 50% of the component having a higher volatility, and the gases from the less volatile liquid would constitute less than 50%. If one were to collect the gases above the mixture and condense them (turn them back to liquid), the condensed liquid would no longer be a 50/50 mixture. The condensed liquid would be "enriched" with the more-volatile liquid. Enriched means the condensed liquid would contain more than 50% of the more-volatile liquid and less than 50% of the less-volatile liquid. In a normal distillation process, the original mixture is heated to increase the rate at which the liquids evaporate so that the separation occurs more quickly.

For example, standard distillation can separate pure water from a solution that contains table salt (NaCl) and water. The "normal" boiling point of water is 100° C., and the boiling point for NaCl is 1413° C. Because water has the lower boiling point, it is more volatile and evaporates more easily than does NaCl. In distillation of salt water, the mixture is heated until it boils. The water vaporizes but the NaCl does not to any measurable extent. The water vapor leaves the original container and is condensed back into liquid water. Since the NaCl never vaporized, it remained in the original container, and the condensed liquid is essentially pure water.

Distillation may also be used to separate the components of a mixture of ethanol and water. Because ethanol is more volatile than water, it evaporates more easily. The condensed liquid, after distillation of a mixture of ethanol and water is enriched in ethanol. The boiling point of ethanol is 78° C., and the boiling point of water is 100° C. Because these boiling points are so close to each other, several distillations are required to achieve maximum separation. Due to the fundamental natures of ethanol and water, 100% separation is not possible by simple distillation because an azeotrope forms. The maximum separation of ethanol and water by simple distillation is about 95% ethanol and 5% water solution.

To get best separation distillation and condensation must be performed a number of times. By using a technique called fractional distillation, many distillations can occur at the same time. In a common oil refinery, this occurs in a fractionating tower, where the temperature at the top is lower than the temperature at the bottom. As a result, the gas fraction comes out at the top of the tower followed by gasoline, kerosene; diesel fuel, lubricating oil, and, finally, the asphalts at the bottom.

Azeotrope distillation utilizes or forms an azeotrope by adding a pure liquid to a liquid mixture to enhance the separability of two or more of the components with similar boiling points. Azeotropic distillation separates liquid mixtures according to their vapor pressures. A liquid mixture having components X and Y, where X and Y cannot be separated by the simple distillation described above, a third liquid Z can be added to create an azeotrope. Component Z, the entrainer, is chosen because it will form a relationship with component X such that they have the same proportions in both the liquid and vapor phases. This means that at a given temperature both Z and X will remain in the liquid phase and all of component Y will vaporize or Y will remain in the liquid phase and a portion of X and Z will vaporize. Maximum boiling point azeotropes are removed as bottoms and minimum boiling point azeotropes are removed as distillates.

In a typical azeotropic distillation procedure, a third component, such as benzene, isopropyl ether or cyclohexane, is added to an azeotropic mixture, such as ethyl alcohol/water, to form a ternary azeotrope. Since the ternary azeotrope is richer in water than the binary ethyl alcohol/water azeotrope, water is carried over the top of the column. The ternary azeotrope, when condensed, forms two phases. The organic phase is refluxed to the column while the aqueous phase is discharged to a third column for recovery of the entraining agent. Certain azeotropes such as the n-butanol/water mixture can be separated in a two-column system without the use of a third component. When condensed and decanted, this type of azeotrope forms two phases. The organic phase is fed back to the primary column and the butanol is recovered from the bottom of the still. The aqueous phase, meanwhile, is charged to the second column with the water being taken from the column bottom. The vapor streams from the top of both columns are condensed, and the condensates run to a common decanter.

The combination of chemical reaction with distillation in only one unit is called reactive distillation. Reactive distillation combines reactors and distillation units when reversible or consecutive chemical reactions occur. In reactions where the amount of desired product formed is limited by an equilibrium equation, such as esterification and ester hydrolysis reactions, continuously removing the product from the reaction by distillation yields an extent of reaction that far exceeds the amount of product that would be obtained by a batch reaction followed by distillation. Extractive distillation is somewhat similar to azeotropic distillation in that it is designed to perform the same type of task. In azeotropic distillation, the azeotrope is broken by carrying over a ternary azeotrope at the top of the column. In extractive distillation, a higher boiling compound is added and the solvent to be recovered is pulled down the column and removed as the bottom product. A further distillation step is then required to separate the solvent from the entraining agent. This is the process by which an agent is added to modify the relative volatility between the key components without forming an azeotrope.

In distillation terminology, "stripping" refers to the removal of a volatile component from a less volatile substance. For example in an ethyl alcohol/water system, stripping is done in the column below the feed point, where the alcohol enters at about 10% by weight and the resulting liquid from the column base contains less than 0.02% alcohol by weight. This is known as the stripping section of the column. This technique does not increase the concentration of the more volatile component, but rather decreases its concentration in the less volatile component. A stripping column also can be used when a liquid such as water contaminated by toluene cannot be discharged to sewer. For this pure stripping duty, the toluene is removed within the column, while vapor from the top is decanted for residual toluene recovery and refluxing of the aqueous phase.

The term "steam stripping" can be applied to any system where rising steam vapors in a column strip out the volatile components in the liquid. In particular, the term is applied to systems where steam is used to strip out partially miscible organic chemicals, even though the organic chemicals have boiling points above water. For example, toluene, which has a boiling point of 110° C., can be stripped out of water with steam. The low solubility of toluene in water changes the activity coefficient, and the toluene can be stripped off as the water/toluene azeotrope.

For water miscible and water immiscible high volatile compounds, the process is a relatively straight forward distillation system. For many of the systems, vapor liquid equilibrium data are available in the literature and in the many process simulation software programs. Steam stripping can also be used to remove low-volatile components when the components have low miscibility with water. Those compounds can all be effectively removed from water by steam stripping, even though they have a lower volatility than water. This technique has been used for many years, particularly in the petroleum industry, where the presence of steam with low miscibility organics has allowed for high boiling compounds to be distilled at lower temperatures. Due to the low solubility in water, the activity coefficient is greatly increased and the compound forms a low boiling point azeotrope with water. The lower the solubility, the higher the enhancement of the activity coefficient. A general rule is that the ease of stripping of any VOC is directly proportional to its volatility, and since, in practice, it enables some high boiling toxic compounds such as PCBs to be removed by steam stripping. High boiling, fully water miscible compounds cannot be removed by steam stripping. In these cases the water can be removed as distillate from a distillation process.

A problem arises with separating components by known distillation processes when the target component to be recovered is of low volatility and yet tends to degrade at the higher temperatures required for its vaporization at any significant rate. This problem is accentuated further when the starting solution contains contaminants of even lower volatility, such as the numerous salts that are ordinarily found in recovered water/ethylene glycol solutions. For example, in the common separation of ethylene glycol from water, the water is first removed by distillation at one temperature, and the ethylene glycol is separated from the contaminating salts at a higher temperature. Because the ethylene glycol degrades at the higher temperature, the ethylene glycol obtained by this process is degraded and of lesser value. Another example is the separation of amines from non-volatile contaminants, such as the amines used for removing carbon dioxide from natural gas. These amines accumulate contaminants but separation by known distillation techniques degrades the amines.

Accordingly, it is an object of this invention to provide a process that allows separation of a target component from a solution by distillation at lower temperatures that do not degrade the target component.

Another object of the invention is to provide a method whereby a target component is removed from a mixture and contaminating components are easily separated from the evaporator bottoms by precipitation.

SUMMARY OF THE INVENTION

In accordance with the invention a new process, which will be referred to herein as dilutive distillation, uses a miscible solvent of lower boiling point, i.e., higher volatility, to form a binary vapor mixture with the target component to facilitate separation of the target compound from the mixture.

The inventive process is especially useful for distilling a temperature-sensitive target compound from higher-boiling contaminates, such as salts, or high molecular weight polymers. In the normal distillation procedure the lower boiling compounds are removed from the higher boiling compounds leaving the higher boiling compounds behind. These "bottoms," when still a mixture, are subject to further distillation at a higher temperature, and if the target compound is temperature sensitive, distillation (even under vacuum) can destroy the compound. In the case of used ethylene glycol (antifreeze) the thermal damage results in an unacceptable product which has color, odor and altered composition.

According to the new process a temperature sensitive compound is distilled at a lower temperature by co-boiling it with a second compound at a temperature that does not degrade the target compound. After distillation of the mixture and subsequent condensation, the lower-boiling compound can be distilled from the mixture in a standard distillation process to leave the target compound behind. The process utilizes the reduced activity of the target compound caused by the addition of a lower boiling miscible solvent. The use of a lower boiling point, non-azeotrope (dilutive distillation does not depend on the formation of a low boiling azeotrope) as the solvent allows removal of the lower boiling solvent subsequent to co-distillation of the mixture. Thus the target compound can be distilled below its boiling point, thereby removing it from higher boiling or non-boiling compounds, thereby mitigating thermal damage to the target compound and increasing the recovery of the target compound.

Another unique feature of the process according to the invention is that non-volatile compounds (soluble or not) such as salts or polymers, can enhance the extraction of the higher boiling temperature sensitive target component while being concentrated in the bottoms.

By way of example the addition of water to a mixture of used antifreeze containing ethylene glycol, or other contaminated glycol mixture, creates a mixture having a lower boiling point, and the vapor from that mixture contains the higher boiling target (ethylene glycol) compound. As seen from FIG. 1, addition of water to ethylene glycol causes ethylene glycol vapor to be present in the vapor mixtures at temperatures much below the boiling point of the ethylene glycol. Additionally, and uniquely this process concentrates the soluble salts of the antifreeze (or other contaminated glycols) in the mixture, thus enhancing extraction of the glycol from the bottoms.

It will be appreciated that the proportion of water vapor in the vapor mixture is greater than that of the ethylene glycol, which tends to increase the proportion of ethylene glycol in the liquid and, in turn, raise the boiling point of the liquid mixture. In accordance with an important feature of the invention, water is added to the liquid mixture to maintain the boiling point at lower temperatures. The water is preferably obtained from a subsequent distillation of water from the water/ethylene glycol mixture that does not have the contaminants. This recycling of water to provide vaporization of the glycol at lower temperatures is, thus, a dilutive distillation.

The solvent ideally is soluble in the target compound as well as a solvent for the bottom (salts) compounds. Distillation using the miscible solvent results in a reduced boiling point of the mixture, allowing reclamation of the target compound at temperatures that do not thermally degrade the compound. Additionally the salts and/or the high boiling contaminates are maintained in solution allowing for their easy removal from the tower bottoms continuously.

BRIEF DESCRIPTION OF THE PREFERRED EMBODIMENT

DETAILED DESCRIPTION OF-THE INVENTION

Figure 2:
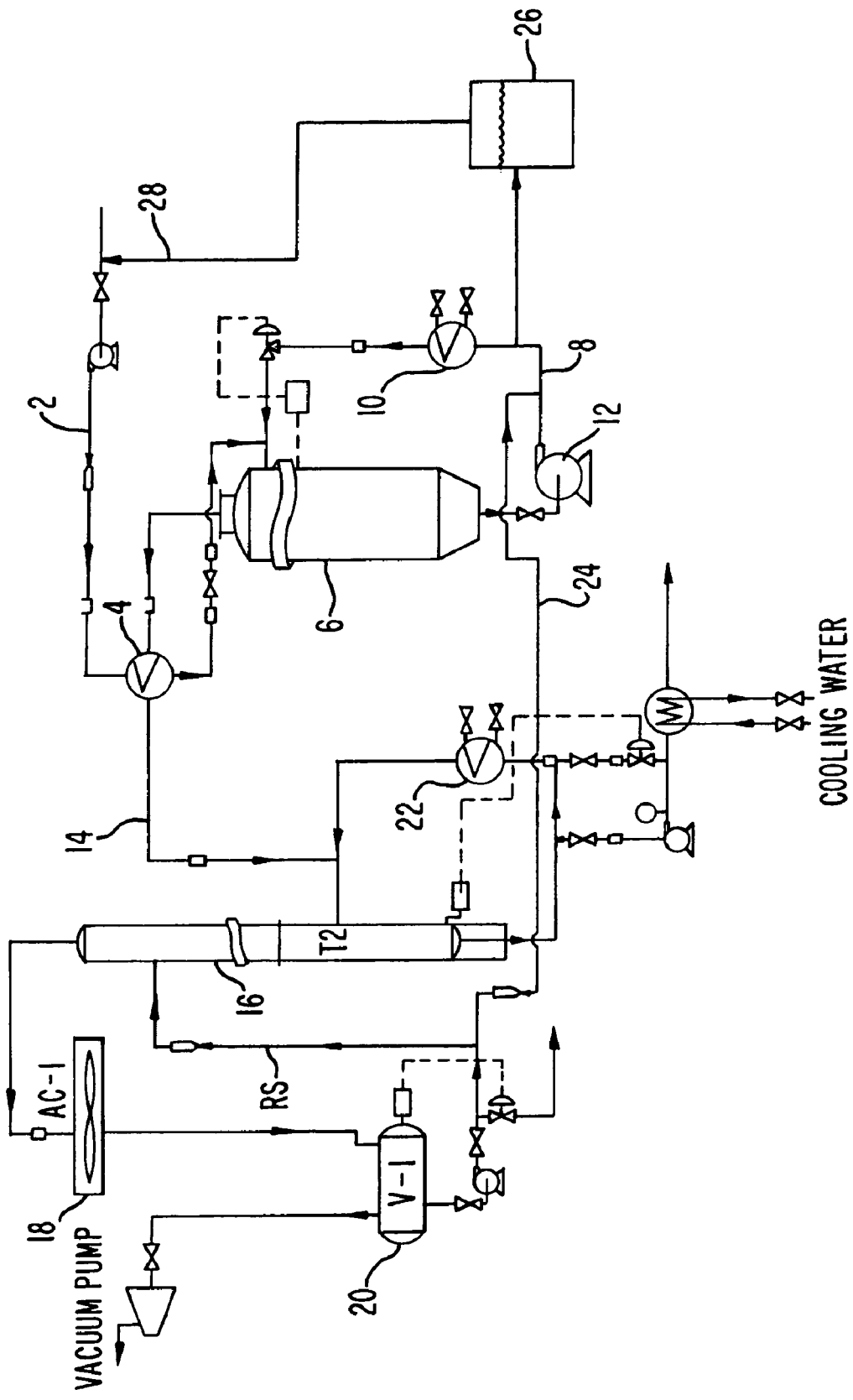
FIG. 2 is a diagram showing a preferred distillation process according to the invention.

With reference to FIG. 2, a system according to the preferred embodiment of the invention is illustrated. A feed stream 2, having, for example, a reclaimed mixture of water, ethylene glycol and various contaminants, is preheated in a heat exchanger 4 and is supplied to an evaporator 6. The heat exchanger 4 is preferably pre-heated with the vapors from evaporator 6. The preheated feed stream is provided to the evaporator 6.

The evaporator 6 is operated at a temperature that does not degrade the target component, e.g., ethylene glycol. For example, the evaporator is maintained at a target temperature of 260° F. At this temperature, the vapor will contain a mixture of components, one of which is the target component and another of which is the miscible solvent. In the ethylene glycol example the solvent is water. The evaporator bottoms 8 are re-circulated through the evaporator heater 10 by pump 12 and returned to the evaporator to add heat to the evaporator.

Figure 1:
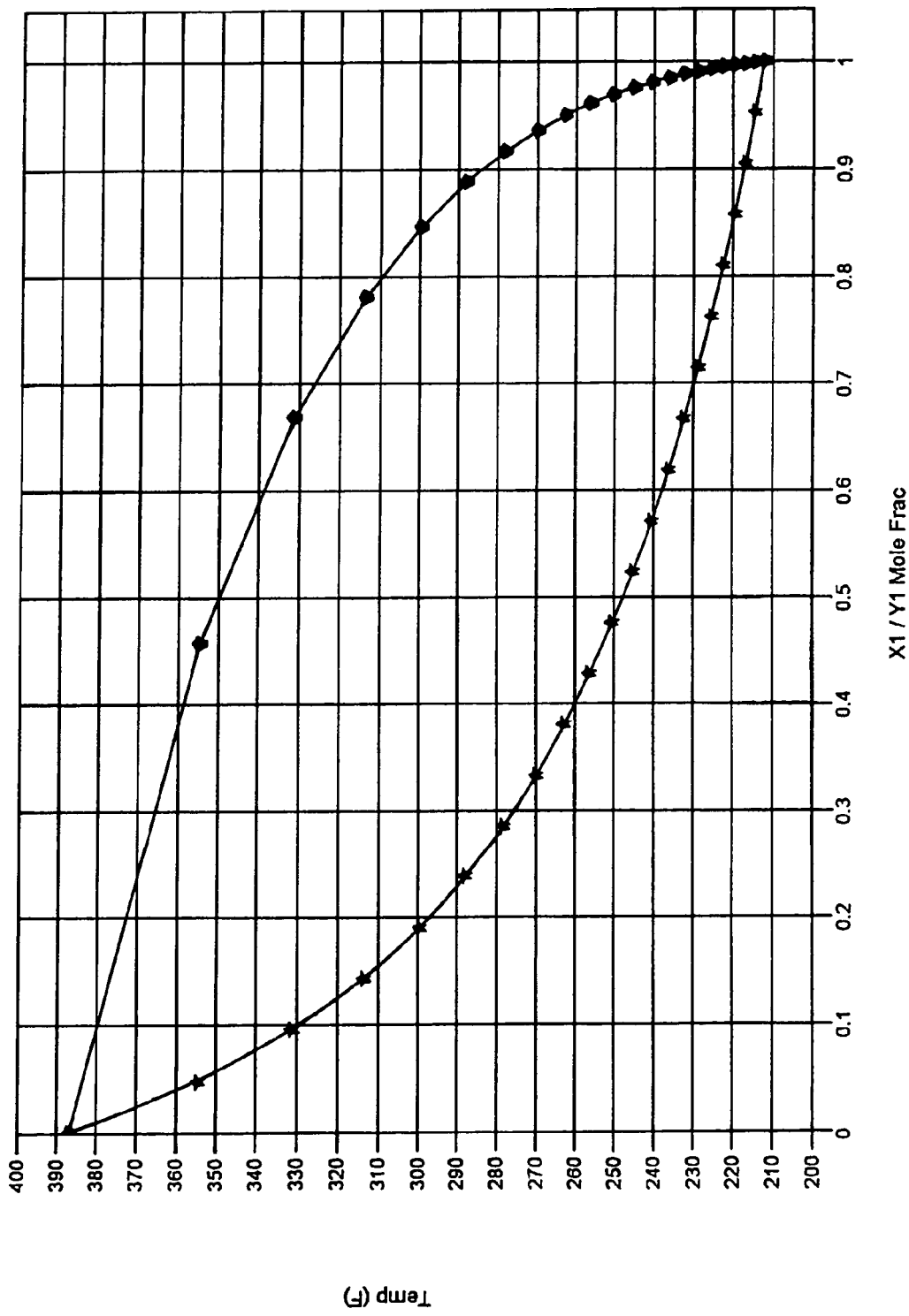
FIG. 1 is a prior art diagram showing the composition of liquid and vapor phases for a mixture of water and ethylene glycol.

The vapor stream 14 from the evaporator, which is a mixture of water and ethylene glycol having a composition that may be determined by reference to FIG. 1, is supplied to a distillation tower 16. The partially condensed evaporator vapors enter the bottom tray of the distillation tower 16 and pass up the tower and through the tower condenser 18. This condensed stream is collected in reflux accumulator 20. This stream is then used as reflux for the distillation tower 16 and as the dilutive solvent in the evaporator 6. The target compound (e.g., ethylene glycol) is further purified in the distillation tower 16 by adjusting the bottom temperature of tower 16 with heat added to the tower re-boiler 22. Depending on the specific compounds being separated, this process can be operated under deep vacuums or required pressures. The miscible solvent (e.g., water) is easily separated from the target component (e.g., ethylene glycol) in the distillation tower 16, among other reasons, because the non-volatile contaminants (e.g., salts) remain in the evaporator 6. The dilutive solvent (e.g., water) is added to the re-circulating bottoms at stream 24 at the discharge side of the circulating pump 12.

In the water/ethylene glycol example given, water is added in such a manner that equilibrium (or near equilibrium) can occur with the evaporator bottoms. Additionally the dilutive solution is added under pressure higher than that of the evaporator and allowed to flash into the evaporator. This pressure differential keeps the dilutive solvent in solution until equilibrium can occur. The dilutive water must be allowed to mix thoroughly with the re-circulating bottoms of the evaporator for the process to work under practical conditions. It has been found that simple addition of the dilutive solvent to the evaporator without adequate mixing results in flashing of the dilutive compound without co-distilling the target compound.

In a process according to the invention, the dilutive solvent is used to control the evaporator temperature, and the level of the evaporator is used to control the feed rate. Thus, if the evaporator temperature begins to rise due to removal of water from the liquid mixture (see the lower curve in FIG. 1), water is added back to reduce the temperature of the mixture and, thus, preclude degradation of the ethylene glycol.

It will be appreciated by those versed in distillation processes that essentially the same design may be used for numerous other target compounds, specifically amines (e.g., MEA and DEA) used in natural gas processing. These amines become contaminated with heat-stable salts and bicine compounds, resulting in a highly corrosive and ineffective solution. The recycling of these amine solutions would be greatly facilitated by use of the dilutive distillation and bottoms salt removal process as described. Standard distillation used currently results in thermal damage to the amine and fouling of the distillation system by heat stable salts. The dilutive distillation system with bottoms treatment solves these problems, simply and economically.

In accordance with another feature of the invention, treatment of the bottoms of the evaporator comprises continuous removal of a small portion of the bottoms to a reservoir such at that shown at 26 in FIG. 2 and cooling the removed bottoms to allow the soluble salts or other high boiling contaminates to precipitate. The precipitate may then be removed from the reservoir easily by density separation, either by simply allowing the cooled bottoms to sediment by gravity, by use of a centrifuge, or by use of a filtration system. This may be made continuous as well by circulating the bottoms into the reservoir 26 and returning the supernatant to the feed line at 28.

This unique process allows for the removal of compounds which typically foul distillation re-boilers, since as the bottoms become saturated with contaminates, precipitation begins and fouling occurs. The simple process of removing a small portion of the bottoms and allowing them to cool resulting in the precipitation of contaminates eliminates this fouling. This removal can be a continuous or batch process, continuous being preferred. This process is based on the fact that most contaminates are less soluble at lower temperatures. In practice this process works very well and is very simple to control and use.

The dilutive distillation system/process presented herein can be in theory modeled with the assumption of equilibrium. Equilibrium is not an absolute requirement and in practice is probably never obtained. However if the dilutive compound is not mixed with the evaporator bottoms, then co-distillation of the higher boiling target compound is reduced, and may result in very little distillation of the target compound and simple recycling of the dilutive solvent. By way of example, the addition of the dilutive material directly to the evaporator causes flashing of the material and no co-distillation of the target compound. Additionally if the dilutive material is added directly to the evaporator pot at the bottom (bottoms), very rapid, flash boiling occurs and no co-distillation occurs. If the dilutive material is added to the top of the pot flashing of the dilutive solution occurs and no co-distillation occurs. So the use of pressure differential to ensure mixing of the dilutive solution with the bottoms results in co-distillation of the target compound.

Modifications within the scope of the appended claims will be apparent to those of skill in the art.

I claim:

1. A distillation process comprising providing to an evaporator a feed stream comprising a mixture of a lower boiling point solvent and a higher boiling point target compound, flashing off from said mixture a multi-component vapor containing said solvent and said target at a temperature of said mixture below the boiling point of said target, separating said target compound from said multi-component vapor, and providing to said evaporator a dilutive solvent comprising additional amounts of said solvent in sufficient amount to maintain said temperature of said mixture in said evaporator during said step of flashing off.

2. A process according to claim 1 wherein said target is mixed with a non-volatile contaminate or a contaminate having a boiling point higher than that of said target, which remains in said evaporator.

3. A process according to claim 2 further comprising the step of providing said multi-component vapor to means for separating said target from said solvent.

4. A process according to claim 3 wherein said means for separating comprises a distillation tower.

5. A process according to claim 3 wherein said solvent is water and said target is ethylene glycol.

6. A process according to claim 3 wherein said target is an amine.

7. A process according to claim 1 further comprising removing bottoms from said evaporator, cooling said bottoms and separating sediment from supernatant, and adding said supernatant to said evaporator.

8. A method for separating a target compound from a mixture of said target compound and a solvent, wherein the boiling point of said target compound is higher than the boiling point of said solvent, said method comprising heating said mixture to a temperature lower than the boiling point of said target compound to provide a multi-component vapor comprising said target compound and said solvent, providing said multi-component vapor to a distillation column, condensing vapors passing up said distillation column to provide a condensed stream, and providing said condensed stream to said mixture wherein said solvent is water and said target compound is ethylene glycol and said temperature is about 260 degrees Fahrenheit.

* * * * *